(12) United States Patent
Werner et al.

(10) Patent No.: US 9,477,754 B2
(45) Date of Patent: Oct. 25, 2016

(54) ONE CLICK FULL-SCREEN VIDEO SYSTEM AND METHOD

(75) Inventors: Robert Douglas Werner, Sunnyvale, CA (US); Daniel Marusich, San Carlos, CA (US); Greg Gilman, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1181 days.

(21) Appl. No.: 12/849,598

(22) Filed: Aug. 3, 2010

(65) Prior Publication Data

US 2011/0072348 A1 Mar. 24, 2011

Related U.S. Application Data

(63) Continuation of application No. 09/813,926, filed on Mar. 20, 2001, now Pat. No. 7,792,925.

(51) Int. Cl.
| | |
|---|---|
| *G06F 17/30* | (2006.01) |
| *H04N 21/858* | (2011.01) |
| *H04N 21/4143* | (2011.01) |
| *H04N 21/431* | (2011.01) |
| *H04N 21/4402* | (2011.01) |
| *H04N 21/61* | (2011.01) |

(52) U.S. Cl.
CPC ... *G06F 17/30855* (2013.01); *G06F 17/30014* (2013.01); *G06F 17/30781* (2013.01); *H04N 21/4143* (2013.01); *H04N 21/4312* (2013.01); *H04N 21/440263* (2013.01); *H04N 21/6125* (2013.01); *H04N 21/858* (2013.01); *H04N 21/8586* (2013.01)

(58) Field of Classification Search
CPC ................. G06F 17/30855; G06F 17/30014; H04N 21/858; H04N 21/8586
USPC ........ 709/203, 206, 219, 231; 715/730, 732, 715/760, 779
See application file for complete search history.

(56) References Cited

U.S. PATENT DOCUMENTS

| | | | |
|---|---|---|---|
| 5,774,666 | A | 6/1998 | Portuesi |
| 5,862,300 | A | 1/1999 | Yagasaki et al. |
| 6,049,333 | A | 4/2000 | LaJoie et al. |
| 6,389,467 | B1 | 5/2002 | Eyal |
| 6,448,986 | B1 | 9/2002 | Smith |

(Continued)

OTHER PUBLICATIONS

"U.S. Appl. No. 09/813,926, Advisory Action mailed Sep. 2, 2009", 3 pgs.

(Continued)

*Primary Examiner* — Aaron Strange
(74) *Attorney, Agent, or Firm* — Schwegman Lundberg & Woessner, P.A.

(57) ABSTRACT

The present invention provides a method and system for playing full-screen video on a user computer. The method includes displaying in the user interface at the user computer a web page containing at least one link to electronic video file, selecting the link to request the video file, downloading the video file to user computer in response to the request, detecting by the user computer receipt of the video file, opening in the user interface to window of the video player in full-screen mode in response to the detecting, and reading the video file by the player to play the video in the window. A feature of the present invention is that the video player may not have its preferences preset by the user to open in any particular mode. The mode in which the video player opens will be determined by the downloaded video file.

18 Claims, 7 Drawing Sheets

(56) References Cited

U.S. PATENT DOCUMENTS

| | | | |
|---|---|---|---|
| 6,452,609 | B1 | 9/2002 | Katinsky et al. |
| 6,513,069 | B1 | 1/2003 | Abato et al. |
| 6,675,212 | B1 * | 1/2004 | Greenwood ................ 709/224 |
| 6,774,912 | B1 | 8/2004 | Ahmed et al. |
| 6,836,791 | B1 | 12/2004 | Levi et al. |
| 7,792,925 | B1 | 9/2010 | Werner et al. |
| 2002/0077900 | A1 | 6/2002 | Thompson et al. |
| 2002/0144278 | A1 | 10/2002 | Pratts et al. |
| 2004/0226042 | A1 | 11/2004 | Ellis |

OTHER PUBLICATIONS

"U.S. Appl. No. 09/813,926, Advisory Action mailed Oct. 1, 2008", 3 pgs.

"U.S. Appl. No. 09/813,926, Applicant's Summary of Examiner Interview filed Nov. 24, 2009", 1 pg.

"U.S. Appl. No. 09/813,926, Examiner Interview Summary mailed Jun. 6, 2007", 2 pgs.

"U.S. Appl. No. 09/813,926, Examiner Interview Summary mailed Oct. 28, 2009", 3 pgs.

"U.S. Appl. No. 09/813,926, Final Office Action mailed May 16, 2008", 16 pgs.

"U.S. Appl. No. 09/813,926, Final Office Action mailed Jun. 24, 2009", 15 pgs.

"U.S. Appl. No. 09/813,926, Non Final Office Action mailed Jan. 7, 2009", 15 pgs.

"U.S. Appl. No. 09/813,926, Non Final Office Action mailed Jan. 7, 2010", 6 pgs.

"U.S. Appl. No. 09/813,926, Non Final Office Action mailed Jun. 1, 2006", 17 pgs.

"U.S. Appl. No. 09/813,926, Non Final Office Action mailed Dec. 1, 2005", 16 pgs.

"U.S. Appl. No. 09/813,926, Notice of Allowance mailed May 10, 2010", 7 pgs.

"U.S. Appl. No. 09/813,926, Response filed Mar. 1, 2006 to Non Final Office Action mailed Dec. 1, 2005", 35 pgs.

"U.S. Appl. No. 09/813,926, Response filed Apr. 7, 2009 to Non Final Office Action mailed Jan. 7, 2009", 38 pgs.

"U.S. Appl. No. 09/813,926, Response filed Apr. 7, 2010 to Non Final Office Action mailed Jan. 7, 2010", 32 pgs.

"U.S. Appl. No. 09/813,926, Response filed Aug. 25, 2009 to Final Office Action mailed Jun. 24, 2009", 35 pgs.

"U.S. Appl. No. 09/813,926, Response filed Sep. 16, 2008 to Final Office Action mailed May 16, 2008", 34 pgs.

"U.S. Appl. No. 09/813,926, Response filed Oct. 16, 2008 to Advisory Action mailed Oct. 1, 2008", 35 pgs.

"U.S. Appl. No. 09/813,926, Response filed Oct. 26, 2009 to Advisory Action mailed Sep. 2, 2009", 35 pgs.

"U.S. Appl. No. 09/813,926, Response filed Dec. 1, 2006 to Non Final Office Action mailed Jun. 1, 2006", 31 pgs.

* cited by examiner

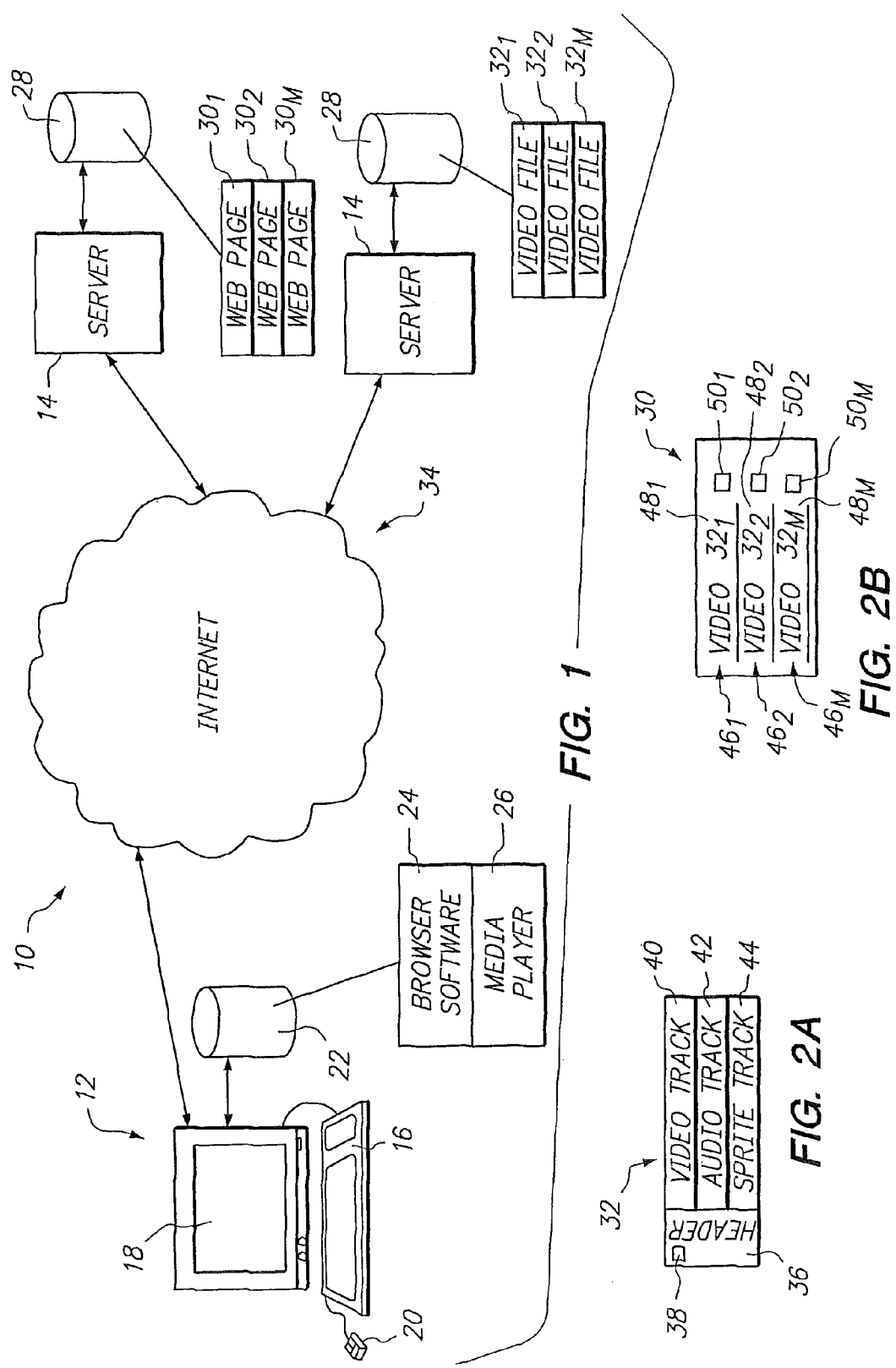

ONE CLICK FULL-SCREEN VIDEO SYSTEM AND METHOD

BACKGROUND OF THE INVENTION

1. Field of the Invention

The present invention relates generally to the viewing in real-time of video content as it is being downloaded from the Internet and, more particularly, to the launching of a video player in full screen mode without user interaction to view the video after requesting its download.

2. Description of the Related Art

The viewing of video content on the Internet continually becomes more popular as the available bandwidth for content providers increases. For example, a news content provider may provide a video of a news story reported live from the location of the news event, similar to the reporting of televised news broadcasts. In such example, a user at a user computer connected to the Internet, through a web browser executing at the user computer, would access the web page of a news service provider, and then read such web page scanning for headlines and abstracts of news stories of particular interest. Typically, the headline of the story is set forth as a hypertext link. Selecting of the link in the user interface, such as by positioning a mouse pointer over the link and clicking the appropriate mouse button, would direct the user to an additional web page containing full text of the desired news story. The additional web page may contain a link to a video file to enable the user to view selectively the "live report," or be encoded to automatically download the video file to the user computer.

Upon the start of the download of the video file, the web browser would detect the receipt of the header of the video file. For the web browser to play to the video file, typically the web browser has been programmed with a helper or browser plug-in which reads the video file and displays the corresponding video in the browser window. Alternatively, the web browser plug-in launches a video player which plays the video in a separate window, usually overlaying the browser window.

In many such examples, similar to the one described above, the quality of the displayed video is of low resolution and is typically displayed in a "postage stamp" window. The low resolution quality is a result of the lack of bandwidth necessary to transmit a sufficient number of pixels to the user computer such that a larger image can be viewed in real-time.

The video file is typically encoded with separate audio and video tracks. For any given time segment of the video, the number of bytes required for the video track far exceeds the number of bytes of the audio track. Real time viewing requires that each track be decoded simultaneously as the video file is being contemporaneously downloaded and played such that the audio and video tracks remain synchronized to each other. Delays in transmission of the video file, caused either by insufficiency of bandwidth or network interruptions, may cause the player to pause playing of the video file until the next frame of data has been received or disconnect completely from the connection with the server from which the video file is being downloaded.

The effect of any such delays may be mitigated by buffering the downloaded electronic data prior to it being read by the video player. As electronic data on the video file is first downloaded, it is temporarily stored in a buffer. The reading of such data by the video player is delayed until a sufficient number of bytes of data have been temporarily stored in the buffer. Ideally, the time rate of reading of the bytes by the video player should not exceed the time rate of storing such bytes in the buffer. Accordingly, the buffer would always contain a number of bytes such that, should any bandwidth or interruption delay occur, there should always be a sufficient number of bytes for the video player and sufficient read without resulting in a pause or disconnect. However, depending on the display size of the video image, for the larger the display size the more bytes that are needed for each frame of data, there may be an insufficient number of bytes in the buffer to prevent such pause or disconnect.

With use of the highest connection speed dial-up modem to connect the user computer to the Internet, there is not much bandwidth available for displaying the video image in real-time much larger than the postage stamp image described above. Otherwise, should the user desire to view a much larger image, the user must download the video file first, and only after the complete video file has been downloaded may the user launched the player and play the video. However, digital subscriber line and cable modem service is becoming more readily available to users. The bandwidth increase of the digital subscriber line and cable modem service will allow for the transmission of more bytes for each frame of video data while enabling the video player to play the video contemporaneously with the download of the video data.

There have been attempts in the prior art to utilize the available bandwidth for the presentation of full-screen video. One such attempt does allow the user to view full-screen video during the download of such video. However, the video player must have its preferences changed by the user to display in full-screen mode the video being downloaded. This change of preferences must occur prior to the actual download in the video. Once the preferences have been changed, the video player cannot be used to view other videos which are not in full-screen mode. Another such attempt claimed that full-screen videos had been accomplished with a novel video player, however, the player window displayed a substantial amount of border adjacent to screen area in which the video is played.

Accordingly, it is desirable to provide a method and apparatus in which the user can download of video file, and view the corresponding video in real-time, irrespective of the screen size which such video requires for viewing. It is also desirable to provide a method and apparatus which does not require the user to change preferences of the video player prior to downloading any such video.

SUMMARY OF THE INVENTION

According to the present invention, a method for playing full-screen video on a user computer includes displaying in the user interface at the user computer a web page containing at least one link to electronic video file, selecting the link to request the video file, downloading the video file to user computer in response to the request, detecting by the user computer receipt of the video file, opening in the user interface to window of the video player in full-screen mode in response to the detecting, and reading the video file by the player to play the video in the window.

A feature of the present invention is that the video player may not have its preferences preset by the user to open in any particular mode. The mode in which the video player opens will be determined by the downloaded video file.

These and other objects, advantages and features of the present invention will become readily apparent to those skilled in the art from a study of the following Description of the Exemplary Preferred Embodiments one in conjunction with the attached Drawing and appended Claims.

BRIEF DESCRIPTION OF THE DRAWINGS

FIG. 1 is a diagram of the computer network in which the method to present invention may be practiced;

FIG. 2A is a block diagram useful to describe an exemplary video file of the present invention;

FIG. 2B is a block diagram useful to illustrate an exemplary web page;

DESCRIPTION OF THE EXEMPLARY PREFERRED EMBODIMENTS

Figure 3A:
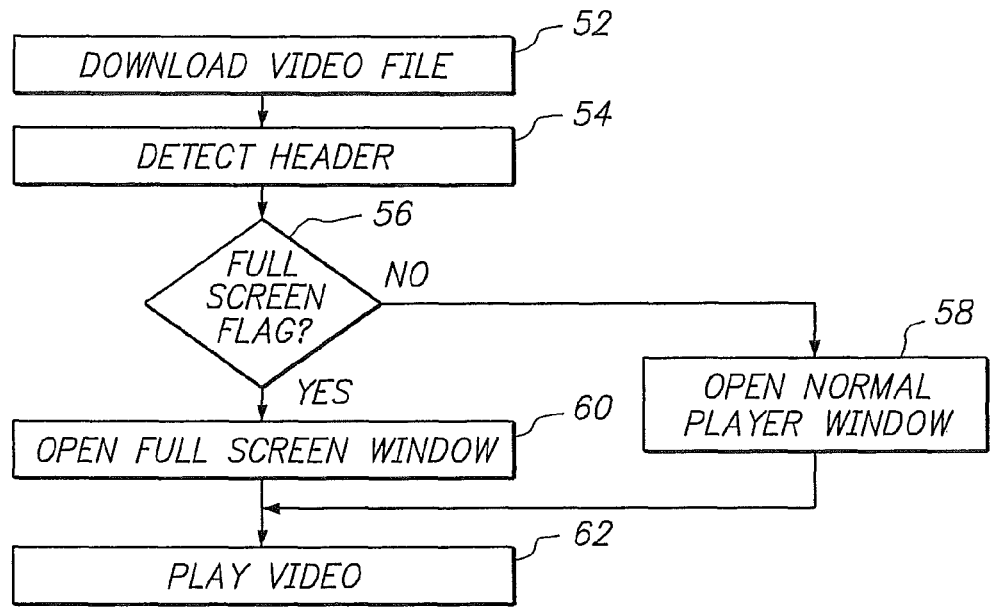
FIG. 3A is a flowchart useful to describe an exemplary method of generating a full-screen video.

Referring now to FIG. 1, there is shown a computer network 10 including a user computer 12 and a plurality of servers 14. The user computer 12 includes a user interface, the user interface being a combination of a keyboard 16, a monitor 18 and a mouse 20, each of which are used separately or in combination with each other to realize the user interface. The user computer 12 also includes a medium 22, such as a hard disk, in which programs are stored for execution on the user computer 12. Examples of such programs are browser software 24 and a media player 26. By way of example, the media player 26 may be the QuickTime player to provide the underlying functionality. Such functionality may include a full-screen mode and a sprite track methodology.

Each of the servers 14 may also include a medium 28, which may be a hard disk, in which server programs, web pages and downloadable video files may be stored. For example, the medium 28 of one of the servers 14 may include a plurality of web pages 30 1-n, and the medium 28 of the other one of the servers 14 may include a plurality of video files 32 1-m. The user computer 12 and each of the servers 14 are connectable to each other via the Internet, generally illustrated at 34. As is well known, the user computer 12 when programmed with the browser software 24 can have access to any of the web pages 30 via an appropriate servers 14 to display a copy of such web pages 30 when connected to such server 14 through the Internet 34.

With additional reference to FIG. 2A, each of the video files 32 has a header 36, the header 36 having a mode flag 38. In addition, each of the video files 32 also has a video track 40, an audio track 42 and a sprite track 44. As best seen in FIG. 2B, one of the web pages 30 may include a plurality of links 46 1-m each of the links 46 identifying the respective one of the video files 32. The links 46 may be in the form of a hypertext link 48 or an icon 50. The user at the user computer 12, when displaying the web page 30, selects a particular one of the links 46. In response to selection of the particular one of the links 46, the server 14 at which the respective one of the video files 32 is stored downloads such video files 32 to the user computer 12. The browser software 24 in the user computer 12 detects the header 36 of the video file 32. When the browser software 24 detects the header 36, it launches the video player 26. Upon being launched, the video player 26 is executable in the user computer 12 and opens in a mode indicated by the mode flag 38. This mode may be a full screen mode.

Now referring to FIG. 3A, there is shown a flowchart useful to describe an exemplary method of generating a full-screen video. As indicated at 52, downloading of the video file 32 to the user computer 12 is made in response to a request, the receipt of the request being made by selecting the links 46 to request the associated video file 32 from displaying in the user interface the appropriate web page 30. In an embodiment, the download is automatic. For example, the selecting may include sending a request from the user computer to a server where the associated video file is located. Then, in response to such request, the associated video file may be automatically downloaded from said server to the user computer. One embodiment displays intermediate information provided by the sprite track 44 during the download process.

By way of example, the download may be a streaming download of digital audio and video that is structured and processed in a continuous flow. By way of example, said streaming download may be presented in a viewing mode while being downloaded. Another example is progressive downloading where the data is downloaded as a compressed file that is then decompressed as the data is being read by the media player 26. In such an example, a partial progressive download may initiate the viewing process as well as the functionality of said method. One embodiment displays intermediate information provided by the sprite track 44 during the presentation of said streaming download or partial progressive download.

As indicated at 54, detecting by the user computer of an initial receipt of the video file is made. An example of such detection is where a web browser detects the header information for the video file. The media player 26 is then launched by the web browser. At 56, a decision is made by detecting whether a flag 38 in the header 36 exists indicating that the player 26 should be open in full-screen mode. If no, the path is taken to 58 wherein the video player 26 opens in the normal window. In one embodiment, the opening automatically occurs absent any user interaction.

Otherwise if the flag 38 is present, the yes path is taken to 60 where in response to the detecting the flag the step of opening in the user interface the window of the video player 26 in full-screen mode is performed. In yet another embodiment, the opening occurs automatically, without any user interaction. At 62, the video is played by reading the video file by the player.

One embodiment includes the display of intermediate information during the download at 52 and the video play at 62. Such intermediate information may be included in the sprite track 44.

As is well known in the art, when the user at user computer 12 selects one of the links 46, the browser software 24 sends a request on the user computer 12 to the server 14 at which the video file 32 is locatable. In response to the request, the server 14 downloads the video file 32 to the user computer 12. By way of example, the download may be a streaming download wherein the audio and video file is processed in a continuous flow. As such, a portion of the download may be placed into a buffer while the information of the download may be buffered. The video player 26 may be playing video from the top of the buffer while newly downloaded data may be added to the bottom of the buffer. One embodiment displays intermediate information provided by the sprite track 44 during the presentation of said streaming download.

Another example may be a progressive download wherein a compressed file is decompressed by the video player 26 as said player is reading said file. A partial progressive download may initiate said method. The video player 26 may then read the video file contemporaneously with the video file 32 being downloaded. In one embodiment of the present invention, the video file 32 is compressed. The video player 26 then de-compresses the video file contemporaneously with reading the video file 32. One embodiment displays intermediate information provided by the sprite track 44 during the presentation of said partial progressive download.

As described hereinabove, the video file 32 is encoded with the plurality of tracks, the video track 40, the audio track 42 and the sprite track 44. The sprite track 44 contains instructions readable by the video player 26. The video player 26 displays in the window of the video player information associated with the instructions. In one embodiment, the sprite track 44 may be downloaded first before any media data such as the audio track 42 and video track 40. Another embodiment downloads the video track 40, the audio track 42 and the sprite track 44 temporally concurrent wherein the sprite track 44 is acted upon first.

Link information, as well as other types of information, may be transmitted as data embedded within the sectors of DVD data itself. In such circumstances, the operating system acts upon said information and generates certain website links locally. An embodiment of the present invention includes such information on a sprite track 44 rather than within a sector of DVD data. The link may be then generated by the sprite track 44 as opposed to locally by an operating system. For example, one of such instructions included in the sprite track 44 could relate to a URL of a selected website. As the video player 26 executes the instruction in the sprite track 44, the video of the player will display a link to such selected website. Such link may be in the form of a hypertext link anchor to the URL of the website or may be an icon anchored to use such URL.

Another example of the instructions which may be included in the sprite track 44 may relate to the downloads status of the video file 32. In this case, the player 26 will display at least one status indicator in response to this instruction. By way of example, the progress bar may be generated by using the sprite track 44 wherein the sprite track 44 may provide information as to the progress of the download. This embodiment is distinguished from a progress bar generated locally at the user client 12 in that the sprite track 44 provides the progress instead of a calculation made locally. For example, the sprite track 44 may provide a custom progress bar, also defined as a status indicator. In one embodiment of the present invention, the status indicator may be continuously refreshable status bar. Alternatively, the status indicator may include continuously refreshable hash marks.

Another one of the instructions in the sprite track 44 may relate to additional video content. The video player 26 in response to the step of instruction would then display the additional video content. As will be described in greater detail hereinbelow, the additional video content may be contained within the sprite track 44 itself or be sourced from another one of the video files 32 1-*m*.

Figure 3B:
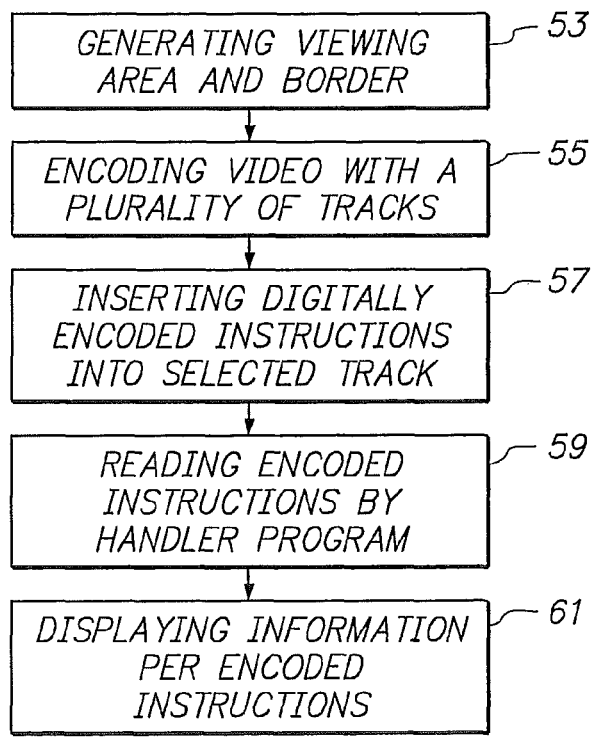
FIG. 3B is a flowchart useful to describe an exemplary method of generating a viewing screen area with an adjacent border.

Shown is FIG. 3B is a flowchart useful to describe an exemplary method of generating a viewing screen area with an adjacent border. As indicated at 53, the opening of the viewing area begins by generating the viewing area where the video is played and an adjacent border. The border may be adjacent to at least one edge of the viewing screen area. In generating said display, the video is encoded with a plurality of tracks, as indicated at 55. Inserted into the selected tracks are digitally encoded instructions, as indicated at 57. Next the digitally encoded instructions are read by a handler program, as indicated at 59. The handler program, by way of example, may be associated to the media player 26. Once read, the encoded information is displayed according to said instructions, as indicated at 61. The instructions may, for example, relate to a URL of a selected website and may display a link to said website within the adjacent border. The link may be a hypertext link or an icon anchored to the URL.

Another example of the instructions may contain information relating to the download status of the video. Such status may be displayed as a status indicator within the adjacent border. By way of example, the status indicator may be a continuously refreshable status bar or hash marks.

The instructions may also contain information relating to additional video content. In response to such instructions, said video content may be displayed in the viewing screen prior to playing the video. For example, specific tracks of the video may be buffered as it is being received at the user computer while playing the additional content from a selected track within the viewing screen.

Another example is inserting an instruction relating to additional video which displays a button for said additional video. The additional video is downloaded in response to the selecting of said button. The instructions may also relate to the display size of the video within the viewing area. In yet another example, the instructions may relate to the download management of the video.

Figure 4:
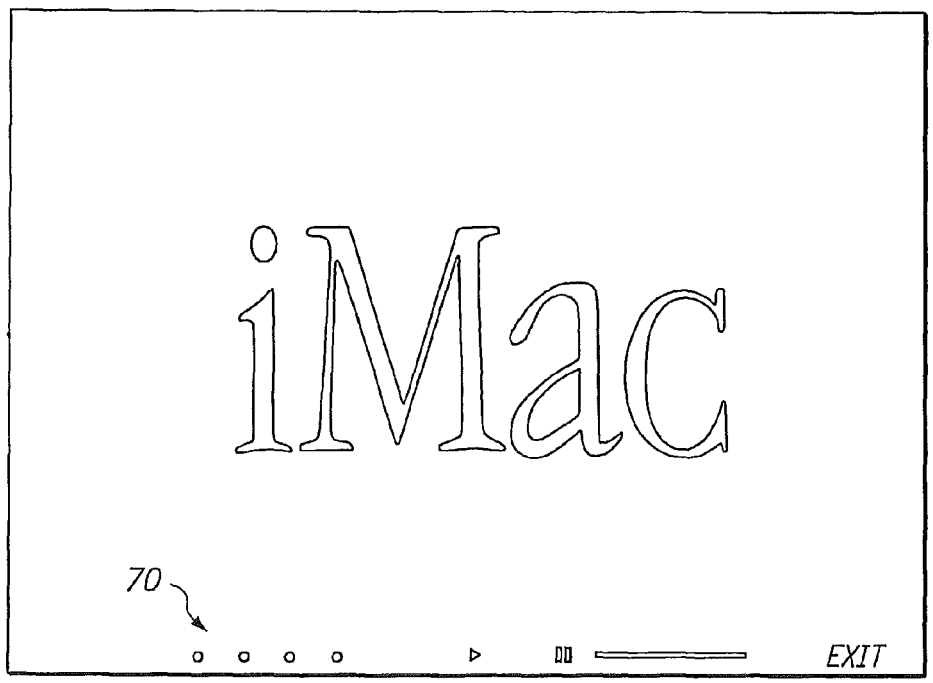
FIGS. 4-10 are screen shots and useful to illustrate operation of the present invention.

As best seen in FIG. 4, there is shown an example wherein the instructions in the sprite track display a plurality of buttons 70. Each of the buttons 70 correspond to a respective one of the video files 32. Selection of one of the buttons 70 will cause the corresponding one of the video files to be downloaded and played by the video player 26.

Figure 5:
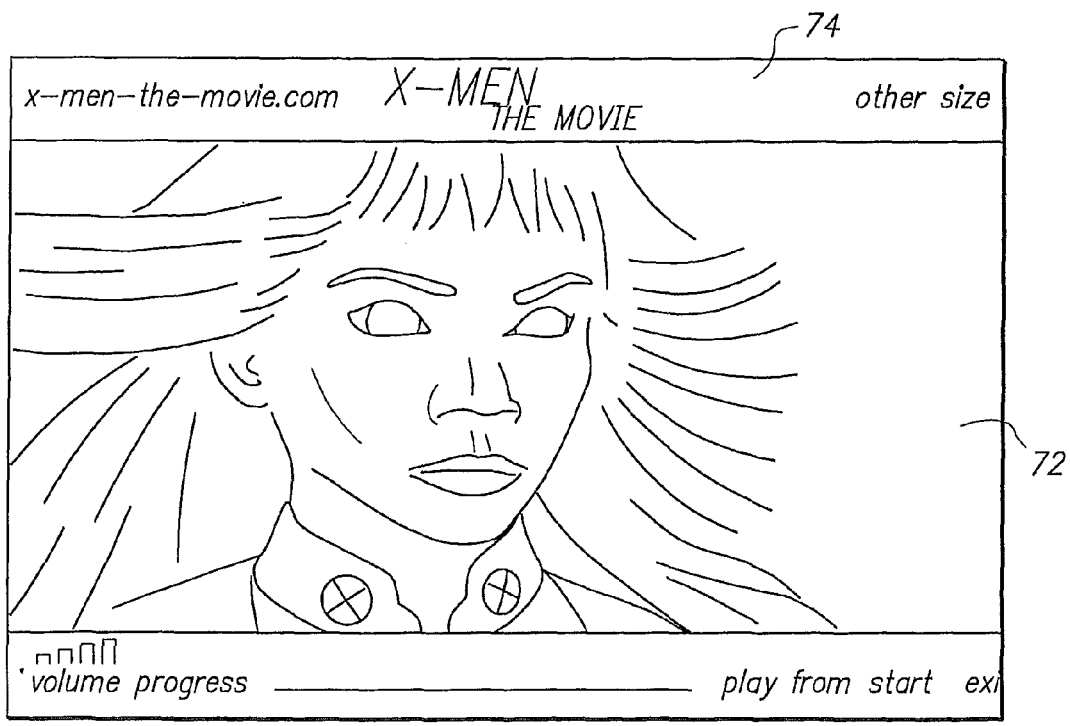
Figure 6:
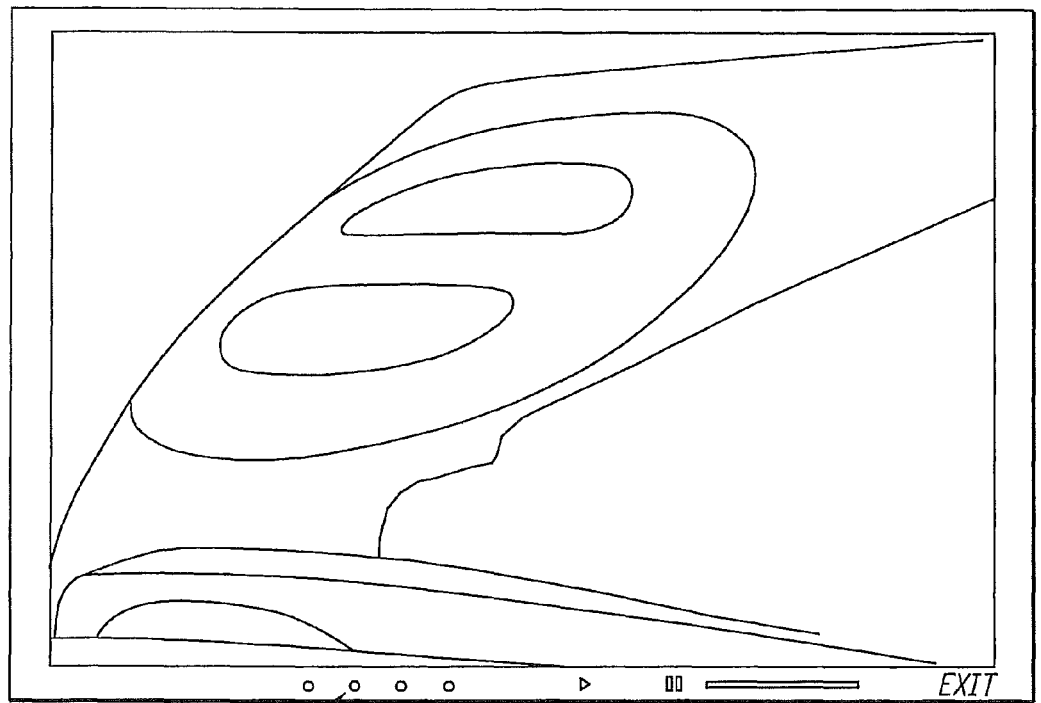
Figure 7:
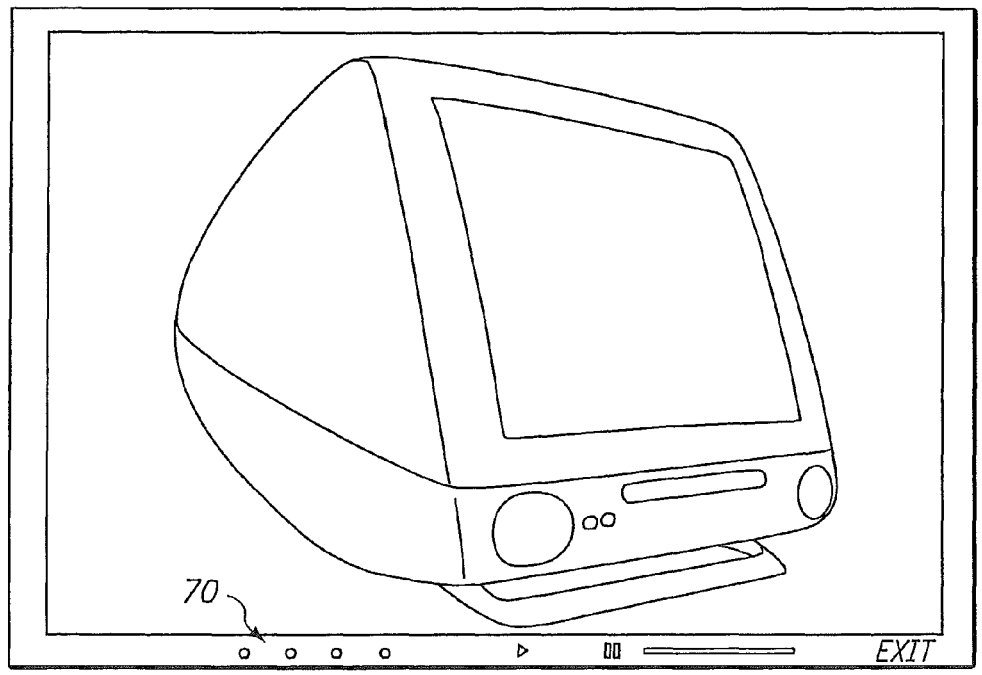
Figure 8:
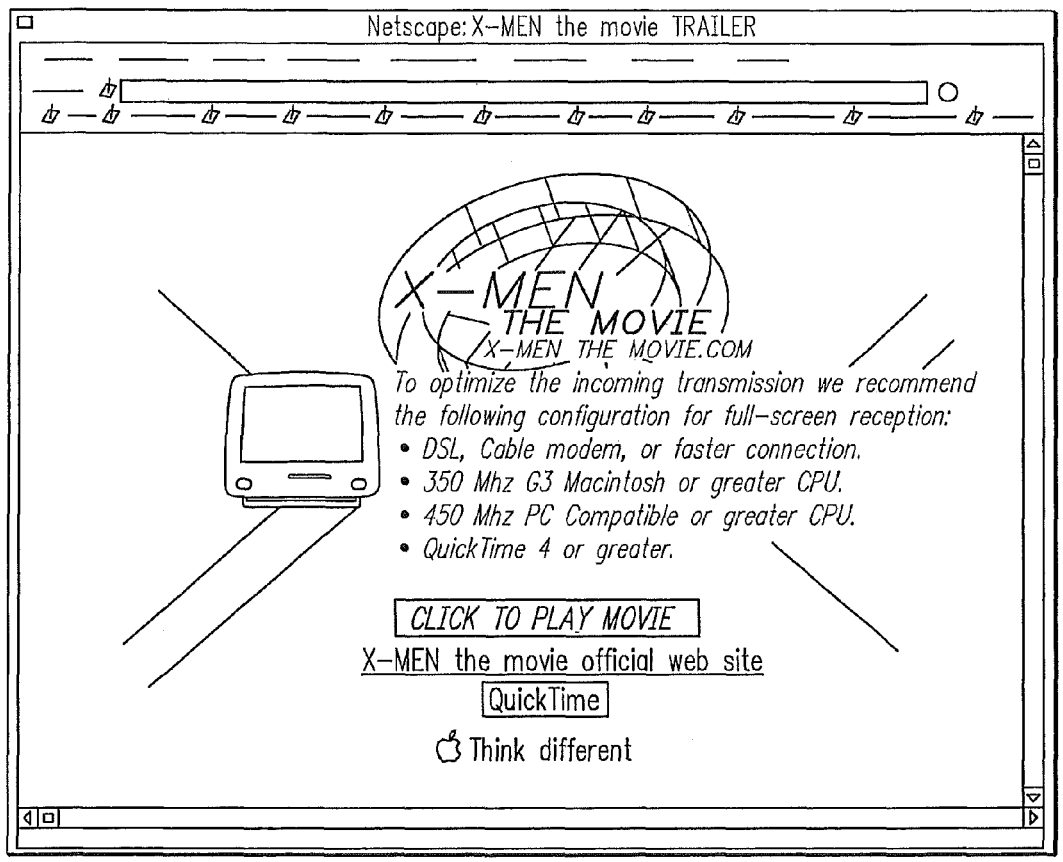
Figure 9:
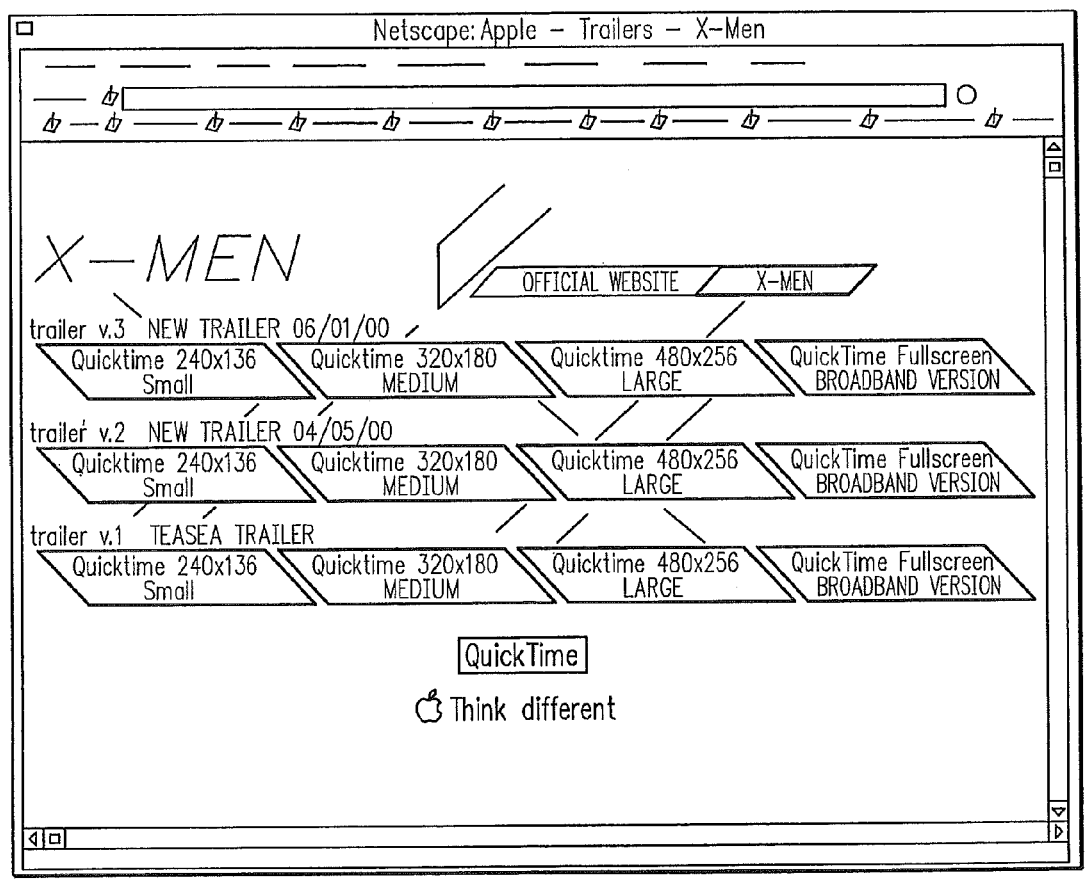
Figure 10:
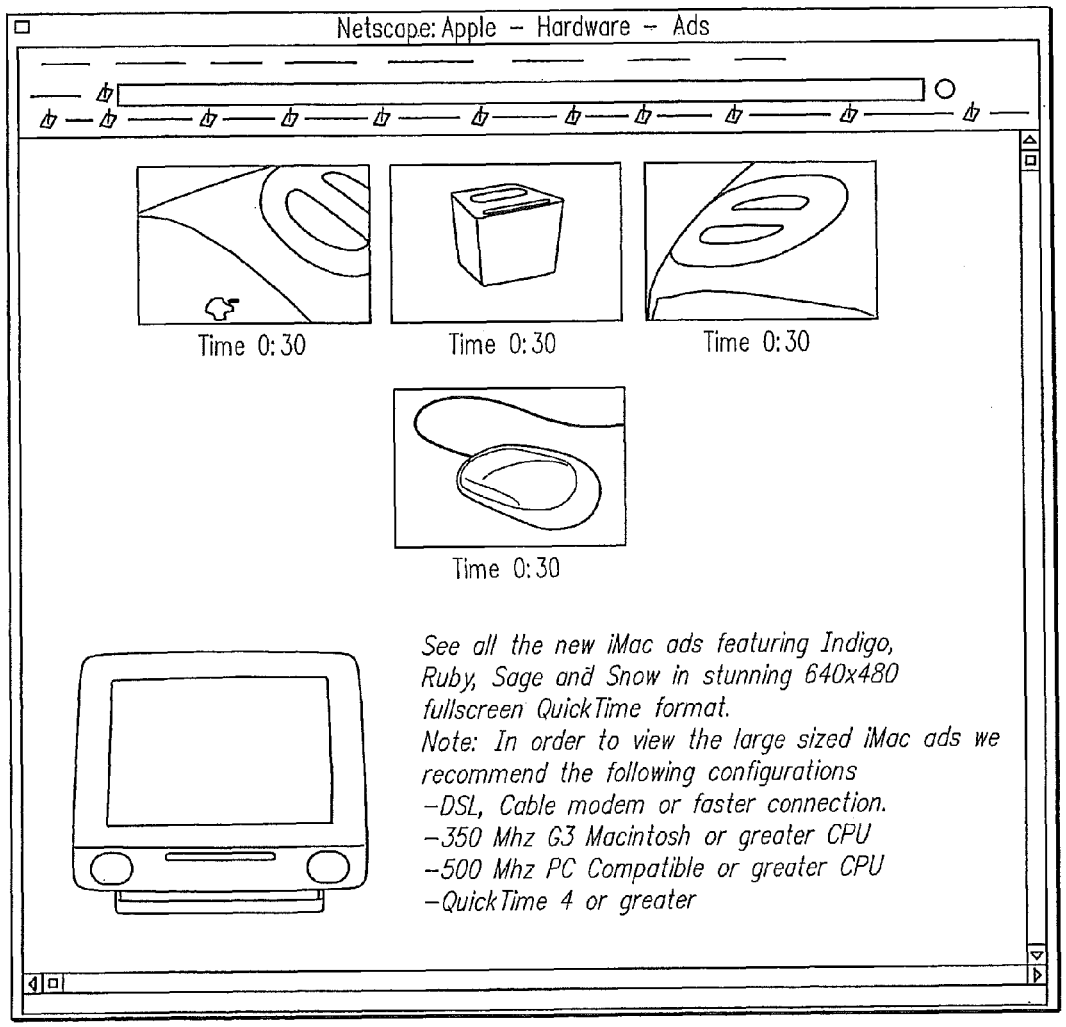

In addition to full screen video, as seen in FIGS. 5-7, the window may include a viewing screen area 72 and a border 74 adjacent at least one edge of the screen area 72, although the border may also be at top and bottom for letterbox video or surround the viewing screen area 72 for a television effect. The instructions in the sprite track may cause display of a control panel, and the status indicator. While the video file is downloading, the instructions in the sprite track may cause an additional video to be viewed. Such additional video can be highly compressed and contained in the sprite track, and not use very much bandwidth. The additional video plays while the desired downloading video is being buffered.

While there has been described what are believed to be exemplary embodiments of the present invention, those skilled in the art will recognize that other and further changes and modifications may be made thereto without departing from the scope of the invention which is defined by the appended claims, and it is intended to claim all such changes and modifications as fall within the true scope of the invention.

The invention claimed is:

1. A method for playing a video on a computer in a network of devices, comprising:
   receiving, at a computing device, a video file associated with a video over the network, wherein the video file is encoded with plural media tracks and an instruction track, and further wherein the instruction track contains instructions readable by a video player;
   downloading each track of the video file; and
   displaying media content generated from the instruction track within a viewing screen of the video player, on a display device associated with the computing device, prior to executing the plural media tracks.

2. The method of claim 1, comprising:
executing instructions included in the instruction track; and
generating the media content as a URL of a selected website based on the executed instructions.

3. The method of claim 1, comprising:
executing instructions included in the instruction track; and
generating the media content as a plurality of buttons, wherein each button corresponds to a respective video file.

4. The method of claim 3, comprising:
downloading one of the respective video files based on a selection of the corresponding button.

5. The method If claim 1, comprising:
executing instructions included in the instruction track while the video track is downloading; and
generating at least one of a control panel and a status indicator as the media content.

6. The method of claim 1, comprising:
executing instructions included in the instruction track while the video track is downloading; and
generating additional video content as the media content.

7. The method of claim 1, comprising:
determining a display mode of the video by reading a header of the video file; and
displaying the video player in the determined display mode.

8. The method of claim 1, wherein the instruction track is downloaded before the plurality of media tracks.

9. The method of claim 1, wherein the instruction track and the plurality of media tracks are downloaded concurrently.

10. The method of claim 1, wherein the plurality of media tracks include an audio track and a video track.

11. A non-transitory computer readable medium encoded with a program, which causes a computer in a network of devices to execute a method for playing a video, the method comprising:
receiving, at the computer, a video file over the network, wherein the video file is associated with a requested video and is encoded with plural media tracks and a sprite track, and further wherein the sprite track contains instructions readable by a video player;
downloading each track of the video file; and
executing an instruction of the sprite track to generate and display, on a display device associated with the computer, media content in the video player before the plural media tracks are executed.

12. The computer readable medium of claim 11, wherein the method further comprises:
displaying a URL of a selected website based on the executed instruction of the sprite track.

13. The computer readable medium of claim 11, wherein the method further comprises:
displaying a plurality of buttons based on the executed instruction of the sprite track, wherein each button corresponds to a respective video file; and
executing and displaying one of the respective video files in the video player when the corresponding button is selected.

14. The computer readable medium of claim 11, wherein at the method further comprises:
determining a display mode of the video player by reading a header of the video file; and
displaying the video player in the determined display mode.

15. An apparatus for playing a video communicated over a network, comprising:
means for requesting video from a device on the network;
means for receiving, at a computing device, a video file associated with the requested video;
means for downloading an instruction track and plural media tracks, wherein the instruction track contains instructions readable by a video player;
means for executing instructions included in the instruction track while the plural media tracks are downloading; and
means for displaying media content from the executed instructions in the video player.

16. The apparatus of claim 15, wherein the display means displays a URL of a selected website based on the executed instruction.

17. The apparatus of claim 15, comprising:
means for receiving a user selection,
wherein the display means displays a plurality of buttons based on the executed instructions of the instruction track and displays one of the respective video files in the video player based on a button selection received from the selection means, and
wherein each button corresponds to a respective video file.

18. The apparatus of claim 15, comprising:
means for detecting a header of the received video file; and
means for determining a display mode of the video player by reading a header of the video file,
wherein the display means displays the video player in the determined display mode.

* * * * *